(12) United States Patent
Kim et al.

(10) Patent No.: US 11,817,602 B2
(45) Date of Patent: Nov. 14, 2023

(54) BATTERY MODULE AND BATTERY PACK INCLUDING THE SAME

(71) Applicants: HYUNDAI MOTOR COMPANY, Seoul (KR); Kia Corporation, Seoul (KR)

(72) Inventors: Yun Ho Kim, Suwon-si (KR); In Gook Son, Hwaseong-si (KR); Jong Wook Lee, Hwaseong-si (KR); Yeon Man Jeong, Yongin-si (KR); Tae Hyuck Kim, Asan-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 2 days.

(21) Appl. No.: 17/394,884

(22) Filed: Aug. 5, 2021

(65) Prior Publication Data

US 2022/0094022 A1  Mar. 24, 2022

(30) Foreign Application Priority Data

Sep. 24, 2020  (KR) .................. 10-2020-0124110

(51) Int. Cl.
*H01M 50/514* (2021.01)
*H01M 10/48* (2006.01)
(Continued)

(52) U.S. Cl.
CPC ....... *H01M 50/514* (2021.01); *H01M 10/425* (2013.01); *H01M 10/48* (2013.01);
(Continued)

(58) Field of Classification Search
CPC ............. H01M 50/514; H01M 50/519; H01M 50/209; H01M 50/287; H01M 50/505;
(Continued)

(56) References Cited

U.S. PATENT DOCUMENTS 5,639,571 A *  6/1997  Waters .............. H01M 10/6563
                                                 180/68.5
10,625,619 B2 *  4/2020  Roh .................... H01M 50/249
(Continued)

FOREIGN PATENT DOCUMENTS

KR   10-2012-0062260    6/2012
KR   10-2019-0124368   11/2019
(Continued)

*Primary Examiner* — Alexander Usyatinsky
(74) *Attorney, Agent, or Firm* — LEMPIA SUMMERFIELD KATZ LLC

(57) ABSTRACT

A battery module includes: a plurality of battery cells mutually laminated in a first direction and forming a laminated structure; a pair of end plates being in surface contact with a first and a second ends of the laminated structure in the first direction; and a pair of busbar assemblies disposed at the first and the second ends of the laminated assembly in a second direction perpendicular to the first direction, each bus bar assembly of the pair of bus bar assemblies including a busbar configured to mutually join electrodes of the plurality of battery cells located at the first and the second ends of the laminated structure in the second direction, a circuit board on which an electrical connection to the busbar is formed, and a connector installed on the circuit board and electrically connected to the busbar assembly through the circuit board.

14 Claims, 21 Drawing Sheets

(51) Int. Cl.
*H01M 10/42* (2006.01)
*H01M 50/287* (2021.01)
*H01M 50/519* (2021.01)
*H01M 50/209* (2021.01)
*H01M 50/505* (2021.01)

(52) U.S. Cl.
CPC ....... *H01M 50/209* (2021.01); *H01M 50/287* (2021.01); *H01M 50/505* (2021.01); *H01M 50/519* (2021.01); *H01M 2010/4271* (2013.01); *H01M 2220/20* (2013.01)

(58) Field of Classification Search
CPC ............... H01M 10/425; H01M 10/48; H01M 2010/4271; H01M 2220/20
See application file for complete search history.

(56) References Cited

U.S. PATENT DOCUMENTS

| | | | | |
|---|---|---|---|---|
| 2014/0134462 | A1* | 5/2014 | Choi | H01M 10/482 429/61 |
| 2014/0154556 | A1* | 6/2014 | Suzuki | H01M 50/211 429/154 |
| 2015/0079447 | A1* | 3/2015 | Park | H01M 50/209 429/121 |
| 2017/0179459 | A1* | 6/2017 | Sato | H01M 50/528 |
| 2018/0261387 | A1* | 9/2018 | Kuboki | H01M 10/482 |
| 2019/0334144 | A1* | 10/2019 | Kim | B23K 9/173 |
| 2020/0067040 | A1* | 2/2020 | Kim | H01M 10/6554 |
| 2021/0036270 | A1* | 2/2021 | Motohashi | H01M 10/647 |

FOREIGN PATENT DOCUMENTS

| | | | |
|---|---|---|---|
| WO | WO 2017146384 | * | 2/2016 |
| WO | WO 2019/198518 | * | 3/2019 |

* cited by examiner

BATTERY MODULE AND BATTERY PACK INCLUDING THE SAME

CROSS REFERENCE TO RELATED APPLICATION

This application claims priority to and the benefit of Korean Patent Application No. 10-2020-0124110, filed on Sep. 24, 2020, the entire contents of which are incorporated herein by reference.

FIELD

The present disclosure relates to a battery module and a battery pack including the same.

BACKGROUND

The statements in this section merely provide background information related to the present disclosure and may not constitute prior art.

Recently, according to the worldwide trends of carbon dioxide emission reduction, demands for an electric car have been greatly increased which generates driving power through driving of a motor with electric energy stored in an energy storage device such as a battery, instead of a typical internal combustion engine car which generates driving power through combustion of fossil fuels.

The performance of the electric car greatly depends on the capacity and performance of the battery corresponding to an energy storage device for storing electric energy provided to a driving motor.

The vehicle battery, which stores the electric energy supplied to the motor to generate the driving power of the vehicle, not only should have excellent electrical-side characteristics, such as excellent charge/discharge performance and long use lifespan, but also should provide the high-level mechanical-side performance capable of being robust against a harsh vehicle driving environment, such as high temperature and high vibration.

Further, from the standpoint of a vehicle manufacturer, it is advantageous to configure the battery hardware in the form of a module having a standardized size or capacity so as to be consistently applied to various vehicle types.

The foregoing is intended merely to aid in the understanding of the background of the present disclosure, and is not intended to mean that the present disclosure falls within the purview of the related art that is already known to those of ordinary skill in the art.

SUMMARY

The present disclosure is proposed to solve the above-mentioned problems, and an object of the present disclosure is to provide a battery module having standardized size and capacity so as to be consistently applied to various vehicle types, and a battery pack including the battery module.

In an aspect of the present disclosure, a battery module includes: a plurality of battery cells mutually laminated in a first direction; a pair of end plates being in surface contact with both ends of a laminated structure in the first direction, respectively, in which the plurality of battery cells are laminated; and a pair of busbar assemblies disposed at both ends of the laminated structure in a second direction vertical to the first direction, and each including a busbar configured to mutually join electrodes of the plurality of battery cells located at the both ends in the second direction, a circuit board on which an electrical connection to the busbar is formed, and a connector installed on the circuit board and electrically connected to the busbar assembly through the circuit board.

In one form of the present disclosure, the busbar may include a plurality of slits, and each of the electrodes of the plurality of battery cells may have a bent portion penetrating the slit and joined to the busbar.

In one form of the present disclosure, both side ends of the busbar may be bent in the first direction, and the electrode of the battery cell disposed at an outermost side in the laminated structure may be joined to the both bent side ends of the busbar in a state that the electrode is not bent.

In one form of the present disclosure, mutually insulated busbars included in one of the pair of busbar assemblies may be electrically connected to different pins of the connector in a mutually insulated state through a circuit pattern formed on the circuit board.

In one form of the present disclosure, the busbar may be screw-fastened to the circuit board.

In one form of the present disclosure, the battery module may further include: a first cover configured to cover one side of the laminated structure in a third direction vertical to the first direction and the second direction; a first clamp having both ends joined to the pair of end plates, respectively, across the first cover from an outer surface of the first cover; and a second clamp having both ends joined to the pair of end plates, respectively, across a surface of the laminated structure facing a surface on which the first cover is disposed.

In one form of the present disclosure, the battery module may further include a second cover and a third cover configured to cover the laminated structure in the second direction from outsides of the pair of busbar assemblies, respectively.

In one form of the present disclosure, the laminated structure may include a plurality of cell assemblies each including a pair of battery cells laminated with a surface pressure pad interposed therebetween, and the plurality of cell assemblies may be laminated in the first direction.

In one form of the present disclosure, the cell assembly may include the laminated battery cells whose electrodes having the same polarity are adjacently disposed.

In one form of the present disclosure, the laminated structure may include the laminated cell assemblies whose electrodes having different polarities are adjacent to each other.

In one form of the present disclosure, the plurality of cell assemblies may be laminated with a hot-melt interposed therebetween.

In one form of the present disclosure, each of the pair of end plates may include an inner plate formed of an insulation material and being in surface contact with the laminated structure and an outer plate configured to cover the inner plate from an outer surface of the inner plate and having stiffness higher than that of the inner plate.

In one form of the present disclosure, the outer plate may be molded on an end portion adjacent to the first cover so as to be spaced apart by a predetermined distance from the laminated structure, and may form an insertion space for inserting a temperature sensor therein.

In one form of the present disclosure, the first clamp may be attached to the first cover, and the both ends of the first clamp may be bent to face the pair of end plates and may be joined to outer surfaces of the end plates.

In one form of the present disclosure, the both ends of the second clamp may be bent to face the pair of end plates and may be joined to the outer surfaces of the end plates.

In another aspect of the present disclosure, a battery pack includes: a plurality of battery modules each including a plurality of battery cells mutually laminated in a first direction, a pair of end plates being in surface contact with both ends in the first direction of a laminated structure, respectively, in which the plurality of battery cells are laminated, and a pair of busbar assemblies disposed at both ends, respectively, in a second direction vertical to the first direction of the laminated structure, and each including a busbar configured to mutually join electrodes of the plurality of battery cells located at the both ends in the second direction, a circuit board on which an electrical connection to the busbar is formed, and a connector installed on the circuit board and electrically connected to the busbar assembly through the circuit board; a lower case on which the plurality of battery modules are seated; and a cell management unit configured to detect voltages of the battery cells in the battery modules through electric wirings connected to the connector of at least a part of the plurality of battery modules.

According to the battery module and the battery pack including the same, since the clamps are welded to both the end plates in the center portions of the battery module in the direction in which the battery cells are laminated, and the end plates are bolt-joined to the covers in the both end portions of the battery module, sufficient stiffness can be secured.

Further, according to the battery module and the battery pack including the same, since the busbar assemblies are adopted and the electrical connection between the electrodes of the plurality of laminated battery cells can be formed through one bending process and one welding process, the processes can be simplified, and the manufacturing quality can be improved through removal of the result deviation between the battery cells.

Further, according to the battery module and the battery pack including the same, since the battery cells constituting the battery pack are produced in the form of a module, the standardized battery cells can be applied to the battery pack having various specifications even if the specification of the battery pack is changed in accordance with the vehicle type. Therefore, a separate design process for disposal of the battery cells in the battery pack can be omitted, and thus the development period and the development costs can be reduced.

Further, According to the battery module and the battery pack including the same, since the battery cells in the battery module can come in contact with the seating surface of the battery pack case through the gap filler without any other interference element, the heat generated from the battery cells can be discharged more effectively.

The effects that can be obtained from the present disclosure are not limited to the above-mentioned effects, and other unmentioned effects will be able to be clearly understood by those of ordinary skill in the art to which the present disclosure pertains from the following descriptions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
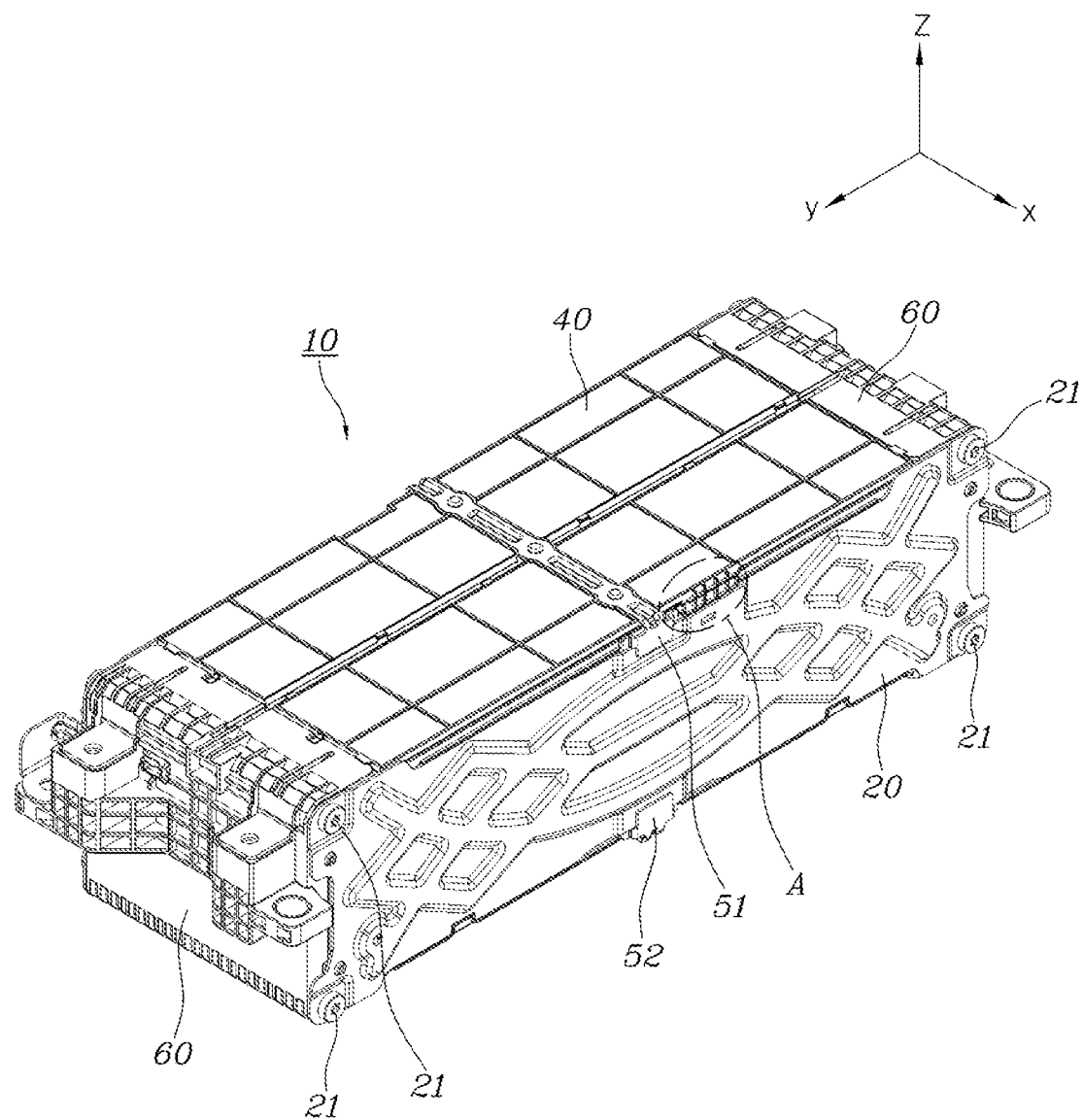
FIG. 1 is a perspective view of a battery module according to one form of the present disclosure when viewed from the top.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a battery module and a battery pack including the battery module according to various forms will be described in more detail with reference to the accompanying drawings.

Figure 2:
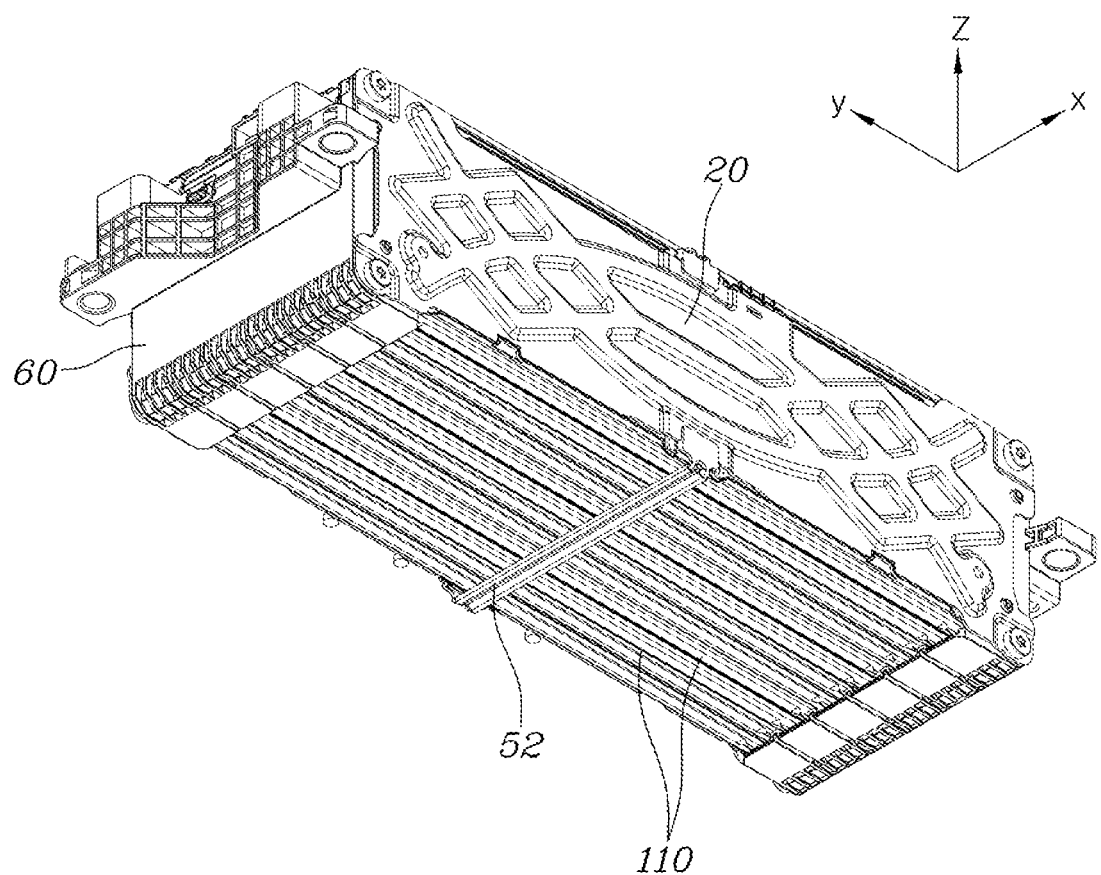
FIG. 2 is a perspective view of the battery module illustrated in FIG. 1 when viewed from the bottom.
Figure 3:
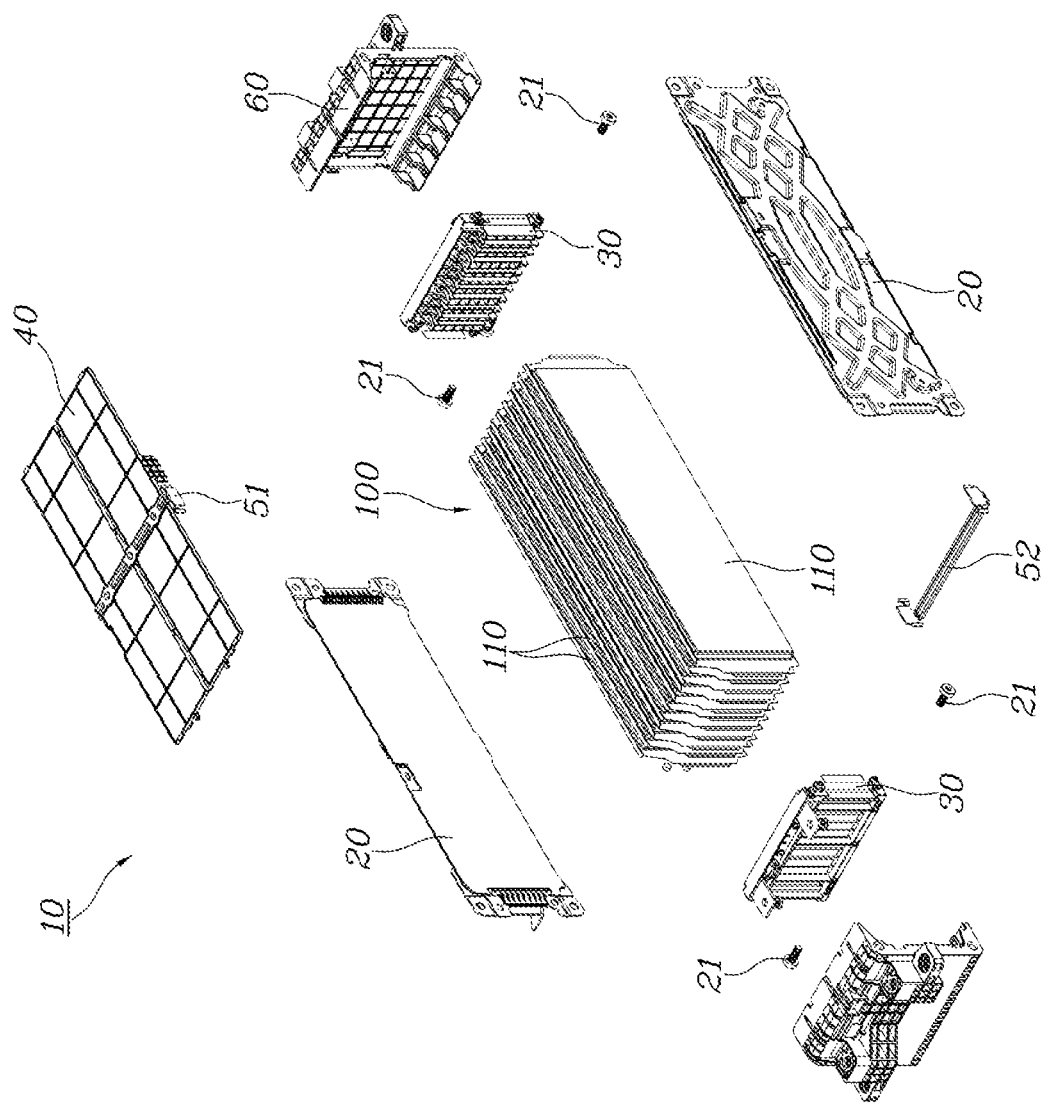
FIG. 3 is an exploded perspective view of the battery module illustrated in FIG. 1.

FIG. 1 is a perspective view of a battery module according to one form of the present disclosure when viewed from the top, FIG. 2 is a perspective view of the battery module illustrated in FIG. 1 when viewed from the bottom, and FIG. 3 is an exploded perspective view of the battery module illustrated in FIG. 1.

Referring to FIGS. 1 to 3, a battery module 10 according to one form of the present disclosure may include: a plurality of battery cells 110 mutually laminated in a first direction (x-axis direction); a pair of end plates 20 being in surface contact with both ends of a laminated structure 100 in the first direction, respectively, in which the plurality of battery cells 110 are laminated; a pair of busbar assemblies 30 disposed at both ends in a second direction (y-axis direction) vertical to the first direction of the laminated structure 100 in which the plurality of battery cells 110 are laminated, the battery cells 110 having electrodes mutually joined to one another; a first cover 40 configured to cover one side of the laminated structure 100 in which the plurality of battery cells 110 are laminated in a third direction (z-axis direction) vertical to the first direction and the second direction; a first clamp 51 having both ends joined to the pair of end plates 20, respectively, across the first cover 40 from an outer surface of the first cover 40; and a second clamp 52 having both ends joined to the two end plates 20, respectively, across a surface of the laminated structure 100, in which the plurality of battery cells 110 are laminated and which faces a surface on which the first cover 40 is disposed.

In addition, the battery module according to one form of the present disclosure may further include a second cover and a third cover 60 configured to cover the laminated structure 100, in which the battery cells 110 are laminated, in the second direction from outsides of the busbar assemblies 30, respectively.

Figure 4:
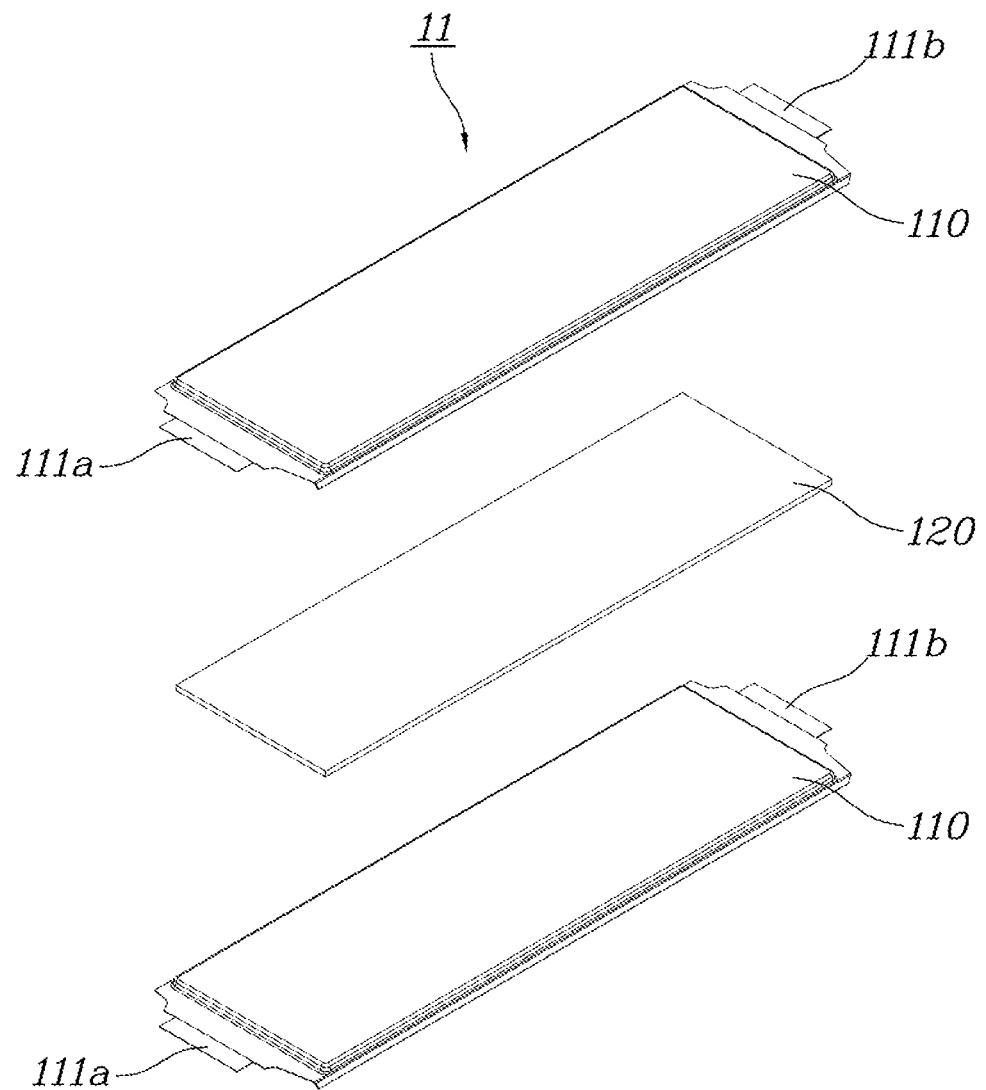
FIG. 4 is a perspective view illustrating the structure of a cell assembly in a battery module according to one form of the present disclosure.
Figure 5:
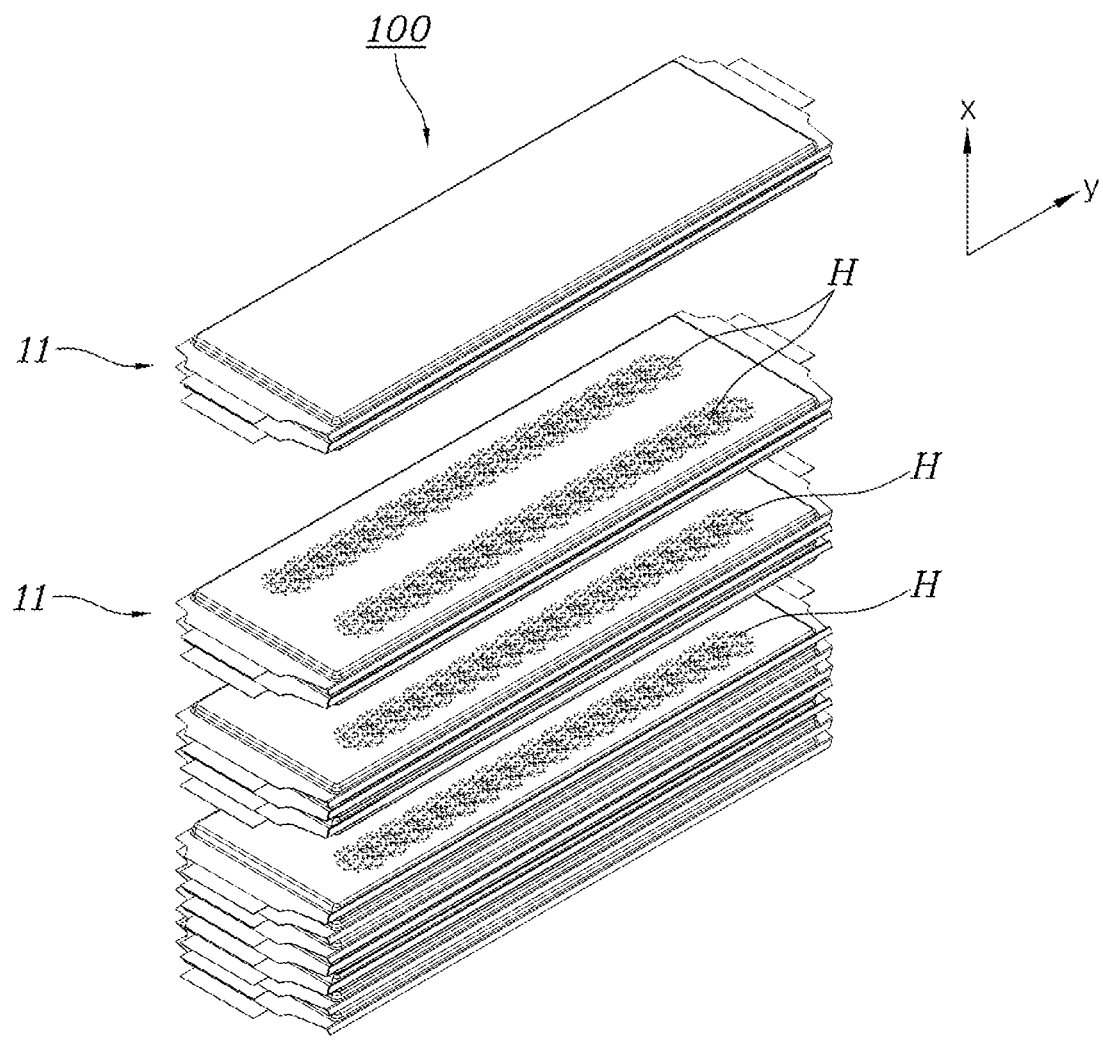
FIG. 5 is a perspective view illustrating the structure of a battery cell laminated structure of a battery module according to one form of the present disclosure.

FIG. 4 is a perspective view illustrating the structure of a cell assembly in a battery module according to one form of the present disclosure, and FIG. 5 is a perspective view illustrating the structure of a battery cell laminated structure of a battery module according to one form of the present disclosure.

As illustrated in FIG. 4, a laminated structure, in which a plurality of battery cells 110 are laminated, may include cell assemblies 11 each including two battery cells 110 and a surface pressure pad 120 interposed therebetween, by mutually laminating one battery cell 110, the surface pressure pad 120, and the other battery cell 110. That is, as illustrated in FIG. 5, the laminated structure 100 may be produced by laminating the plurality of cell assemblies 11 as illustrated in FIG. 4.

In one battery cell assembly 11, the respective battery cells 110 may be disposed so that electrodes (e.g., cathode electrodes 111a or anode electrodes 111b) having the same polarity are adjacent to each other.

The surface pressure pad 120 is an element that provides, when the battery cell 100 is swelled, elasticity thereto and inhibits the module structure from being deformed.

The plurality of cell assemblies 11 may be mutually laminated with a hot-melt H interposed therebetween. The hot-melt H is a kind of liquid joining agent whose adhesiveness is manifested in case that heat is applied thereto, and may be applied onto the surface of the battery cell 110 in a predetermined pattern before the mutual lamination of the plurality of cell assemblies 11. The location relationship between the battery cells can be implemented as desired by aligning the laminated battery cells after the lamination of the cell assemblies 11 and applying heat thereto at once.

In the laminated structure, the respective cell assemblies 11 may be laminated so that the electrodes having different polarities are adjacent to each other. This is to establish an electrically serial connection relationship between the cell assemblies in case that the busbars of the busbar assemblies 30 to be described later and the battery cell electrodes are connected to one another. That is, the battery cells in the cell assemblies 11 may mutually form the electrically serial connection relationship with one another, and the electrically serial connection relationship may be formed between the cell assemblies 11.

Hereinafter, for convenience in explanation, it is assumed that a direction in which the battery cells 110 are laminated is a first direction (x-axis direction), and a direction vertical to the first direction, in which the electrodes of the battery cells 110 are connected to one another, is a second direction (y-axis direction). Further, it is assumed that a direction vertical to the first direction and the second direction, that is, a direction where sides of the battery cells 110, on which the electrodes of the battery cells 110 are not formed, are connected together is a third direction (z-axis direction).

Figure 6:
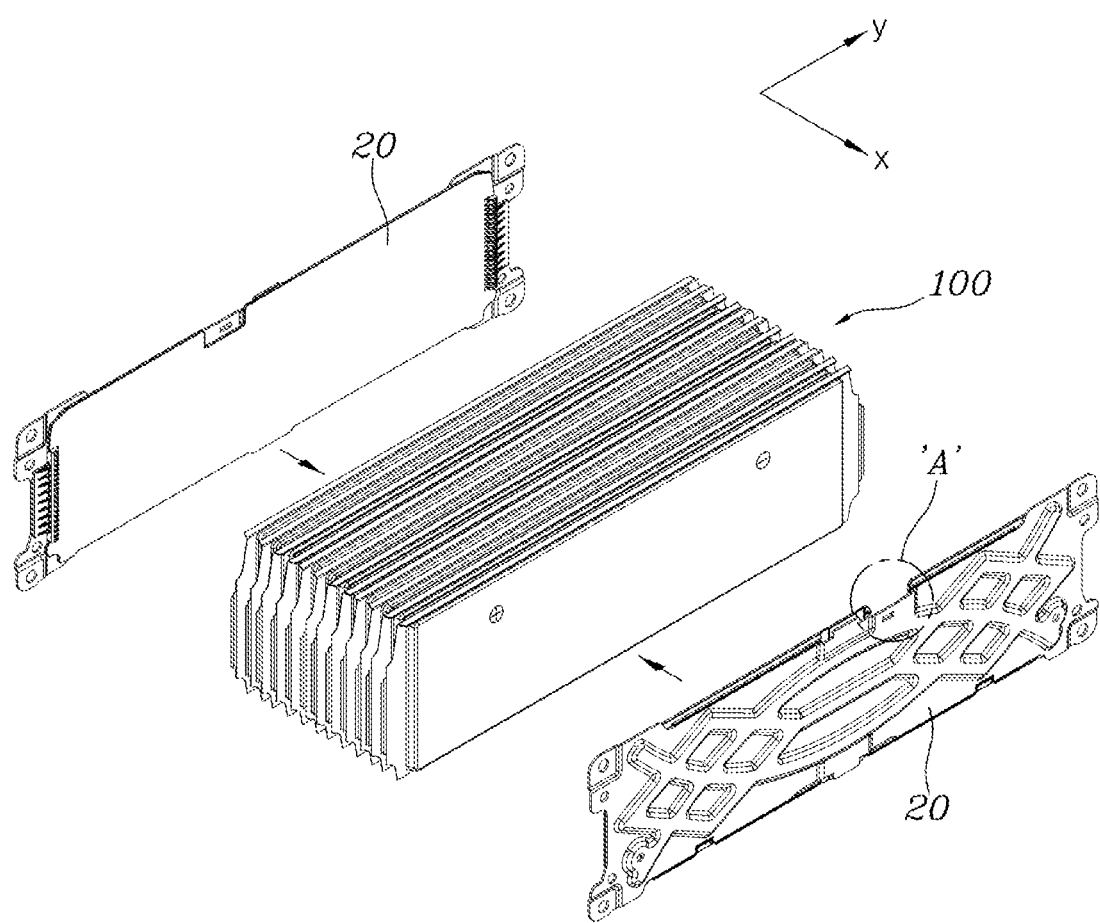
FIG. 6 is a perspective view illustrating a location relationship between a laminated structure and end plates of a battery module according to one form of the present disclosure.

FIG. 6 is a perspective view illustrating a location relationship between a laminated structure and end plates of a battery module according to one form of the present disclosure.

As illustrated in FIG. 6, the pair of end plates 20 may be disposed to come in surface contact with surfaces located at both ends of the laminated structure 100 in the first direction that is the lamination direction of the battery cell laminated structure 100, that is, exposed surfaces of the battery cells located outermost sides among the plurality of battery cells 110 constituting the laminated structure 100.

The pair of end plates 20 are elements that are mutually maintained at a constant interval, and if the battery cells 110 swell, inhibit, using their own stiffness, the battery module from being deformed, and uniformly maintain the surface pressure between the laminated battery cells 110. Accordingly, the end plates 20 should have stiffness enough to inhibit the deformation in the battery module while maintaining the surface contact with the battery cells 110, and may also include an additional means for uniform surface pressure.

Figure 7:
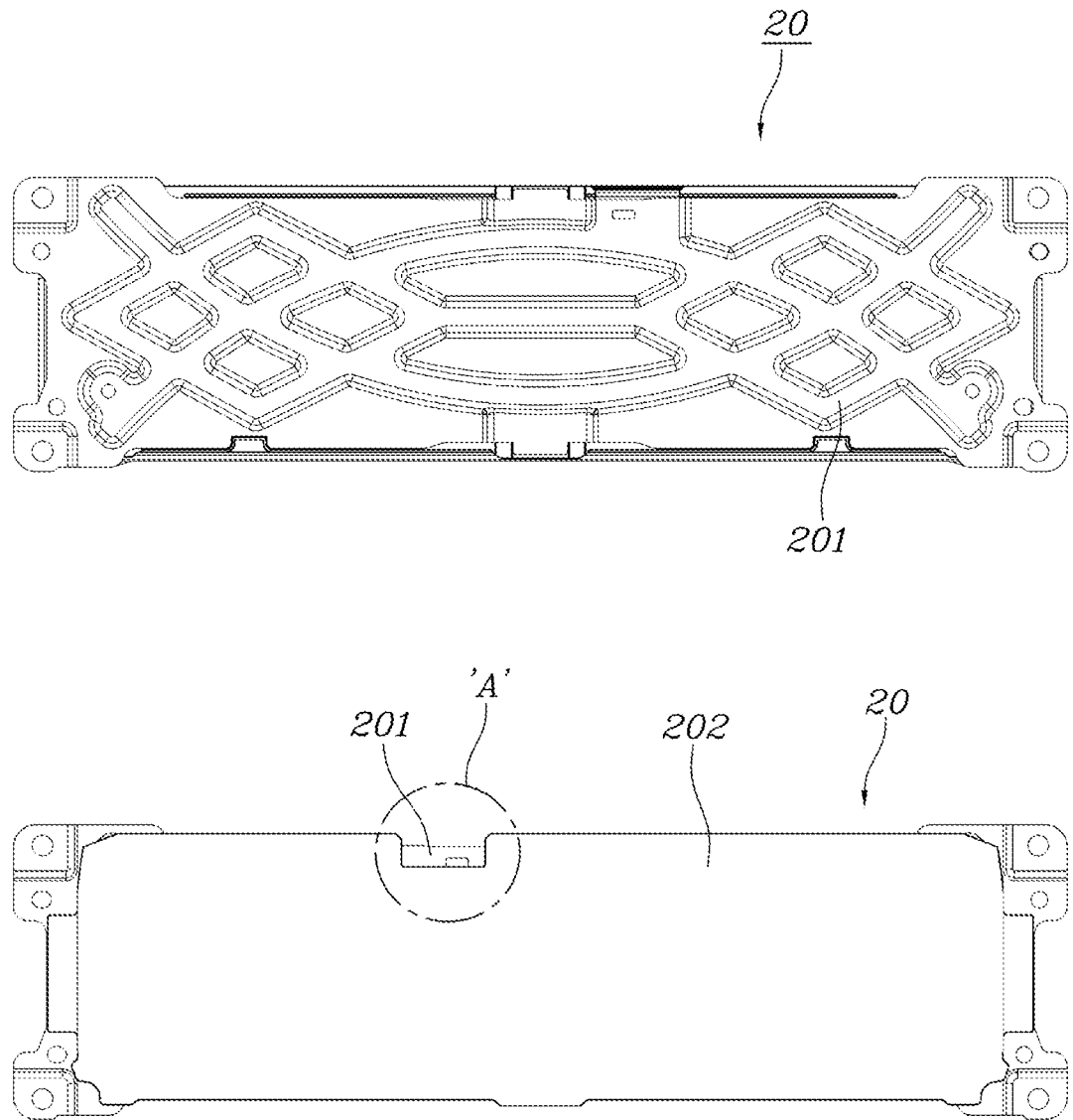
FIG. 7 is an enlarged plan view of each of an outer surface and an inner surface of an end plate illustrated in FIG. 6.

FIG. 7 is an enlarged plan view of each of an outer surface and an inner surface of an end plate illustrated in FIG. 6.

As illustrated in FIG. 7, each of the end plates 20 may include an outer plate 201 exposed to an outside of the battery module 10, and an inner plate 202 covered by the outer plate 201 and being in surface contact with the battery laminated structure 100. The outer plate 201 may be implemented by a metal material, such as aluminum, so as to achieve lightweight while providing sufficient stiffness. The inner plate 202 may have stiffness lower than the stiffness of the outer plate 201, and may be implemented by an insulation material, such as plastic, capable of securing electrical insulation in case that the inner plate 202 comes in surface contact with the outermost battery cell 110 of the laminated structure 100.

Figure 8:
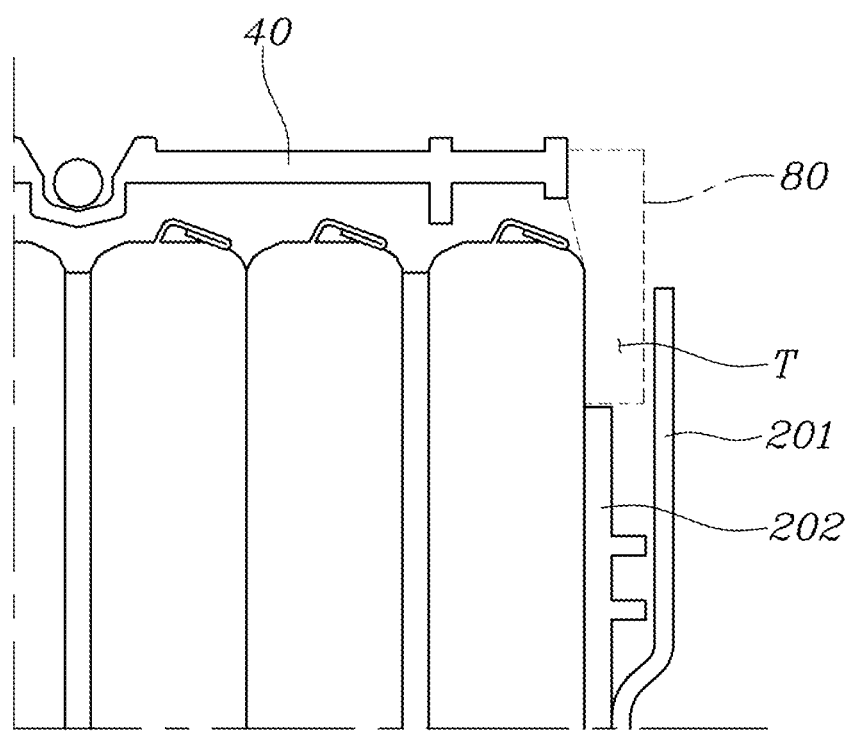
FIG. 8 is a partial cross-sectional view illustrating in more detail an insertion space formed in an outer plate illustrated in FIG. 7.

FIG. 8 is a partial cross-sectional view illustrating in more detail an insertion space formed in an outer plate illustrated in FIG. 7.

In one form of the present disclosure, on a side located in the second direction of the outer plate 201 of the end plate 20, an insertion space T may be formed, into which a temperature sensor 80 that is spaced apart by a predetermined distance from the laminated structure 100 can be inserted by applying various metal forming technologies. An area in which the insertion space T is formed corresponds to a portion indicated by reference numeral "A" in FIGS. 1, 6, and 7, and FIG. 8 corresponds to a cross-section view obtained by cutting the area corresponding to "A" in the first direction.

According to one form of the present disclosure, one battery pack may be implemented by disposing the plurality of battery modules 10 in a case designed to suit the vehicle type. In order to manage the battery pack, it is very important to grasp an internal temperature thereof, and the battery modules are produced typically in the form in which temperature sensors are built therein. According to one form of the present disclosure, the temperature sensor is not built in the battery module itself, but the space T in which the temperature sensor can be installed may be provided after the plurality of battery modules are disposed in the case.

In particular, according to the battery module 10 according to one form of the present disclosure, the battery cells are exposed without providing a separate covering means on an opposite surface facing the surface on which the first cover 40 is installed, and the surface from which the battery cells are exposed is disposed toward a bottom surface of the case. Accordingly, the temperature sensor insertion space T may be formed at an end portion of the outer plate 201, adjacent to the first cover 40, so as to provide a predetermined space between the battery cell laminated structure and the outer plate 201.

Figure 9:
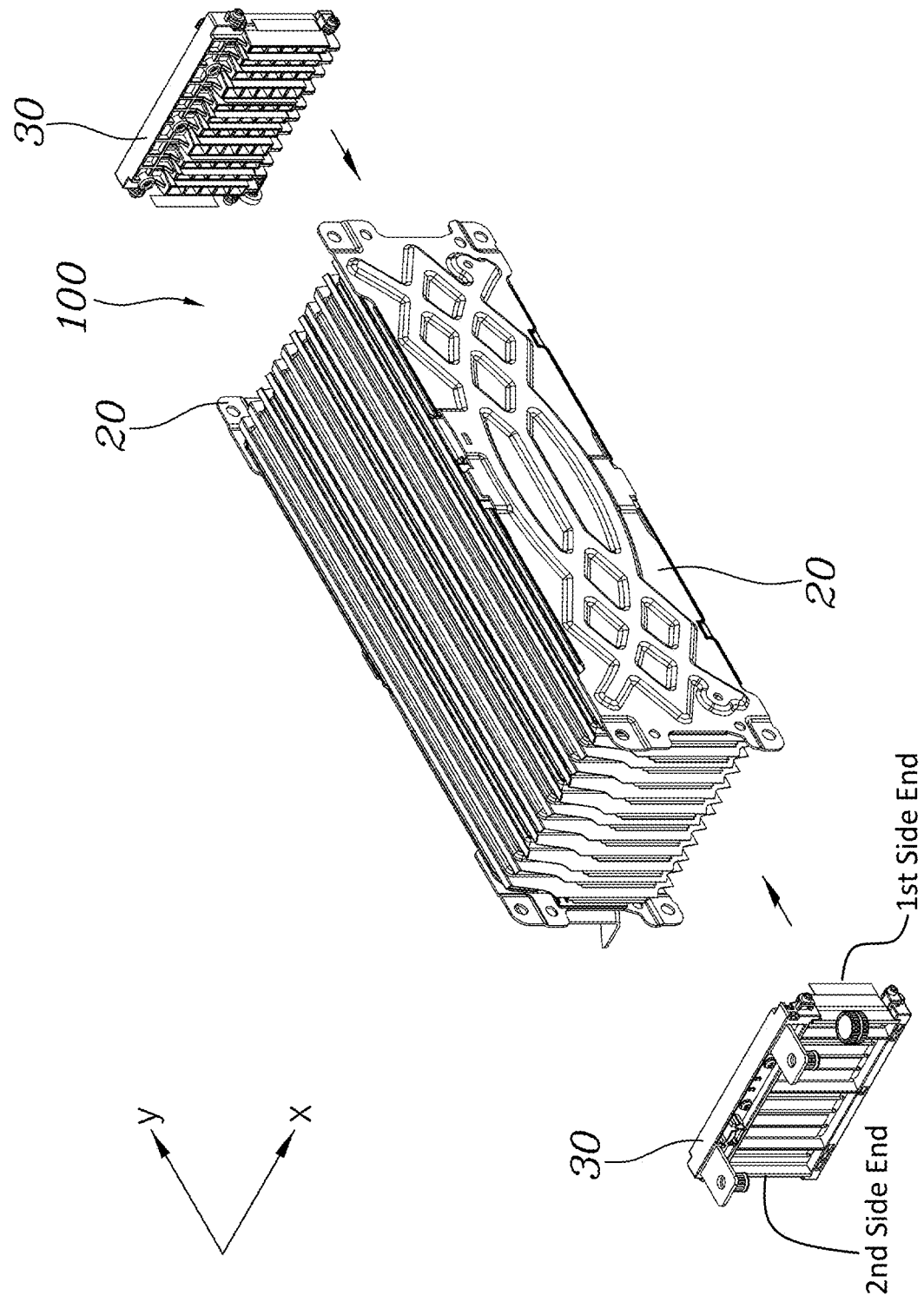
FIG. 9 is a perspective view illustrating a location relationship between a laminated structure and busbar assemblies of a battery module according to one form of the present disclosure.

FIG. 9 is a perspective view illustrating a location relationship between a laminated structure and busbar assemblies of a battery module according to one form of the present disclosure.

As illustrated in FIG. 9, the busbar assemblies 30 may be installed at both ends of the laminated structure 100 in the second direction that is vertical to the lamination direction of the battery cell laminated structure 100, that is, in the direction in which the electrodes 111a, 111b of the battery cells 110 are connected to one another.

The busbar assemblies 30 are elements that are provided with busbars for forming electrical connection between the electrodes 111a, 111b of the battery cells 110 in the laminated structure 100.

Figure 10:
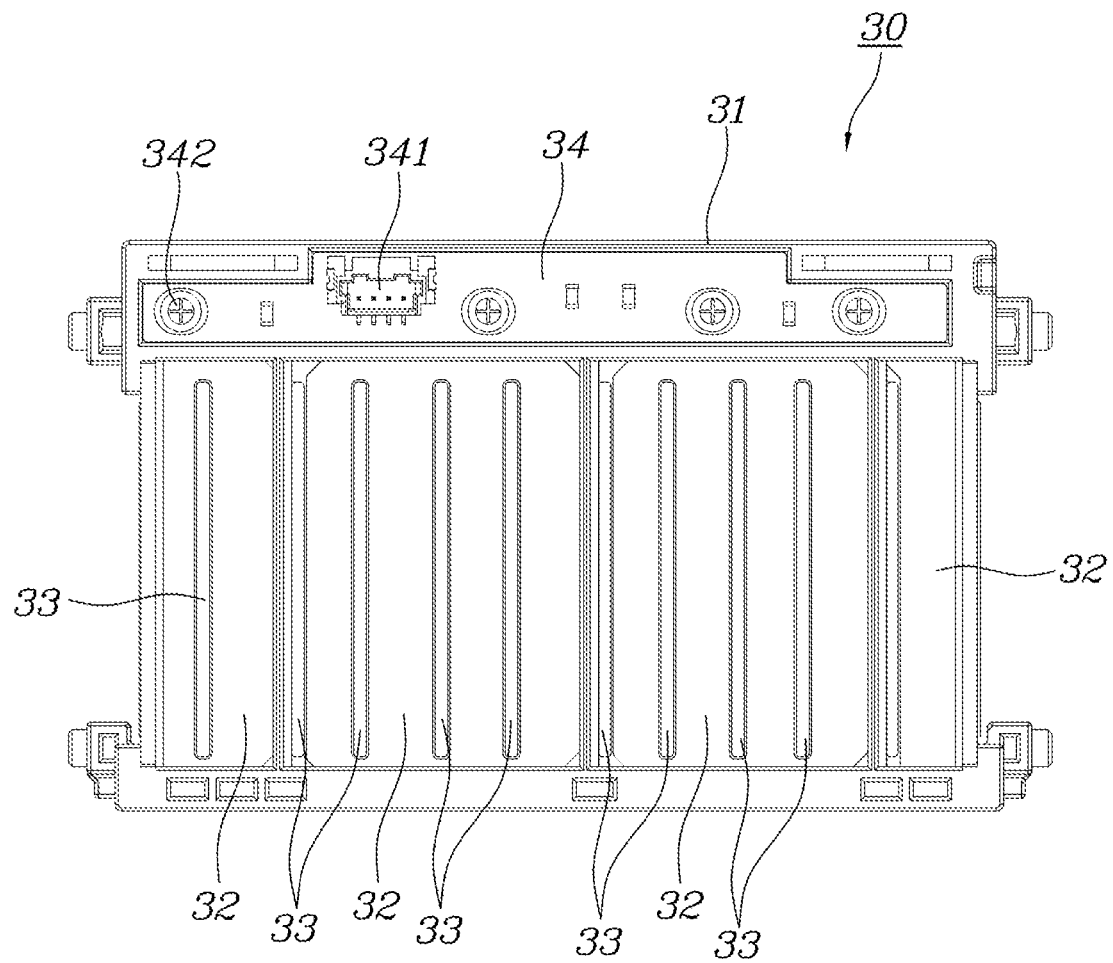
FIG. 10 is an enlarged plan view of a busbar assembly applied to a battery module according to one form of the present disclosure.
Figure 11:
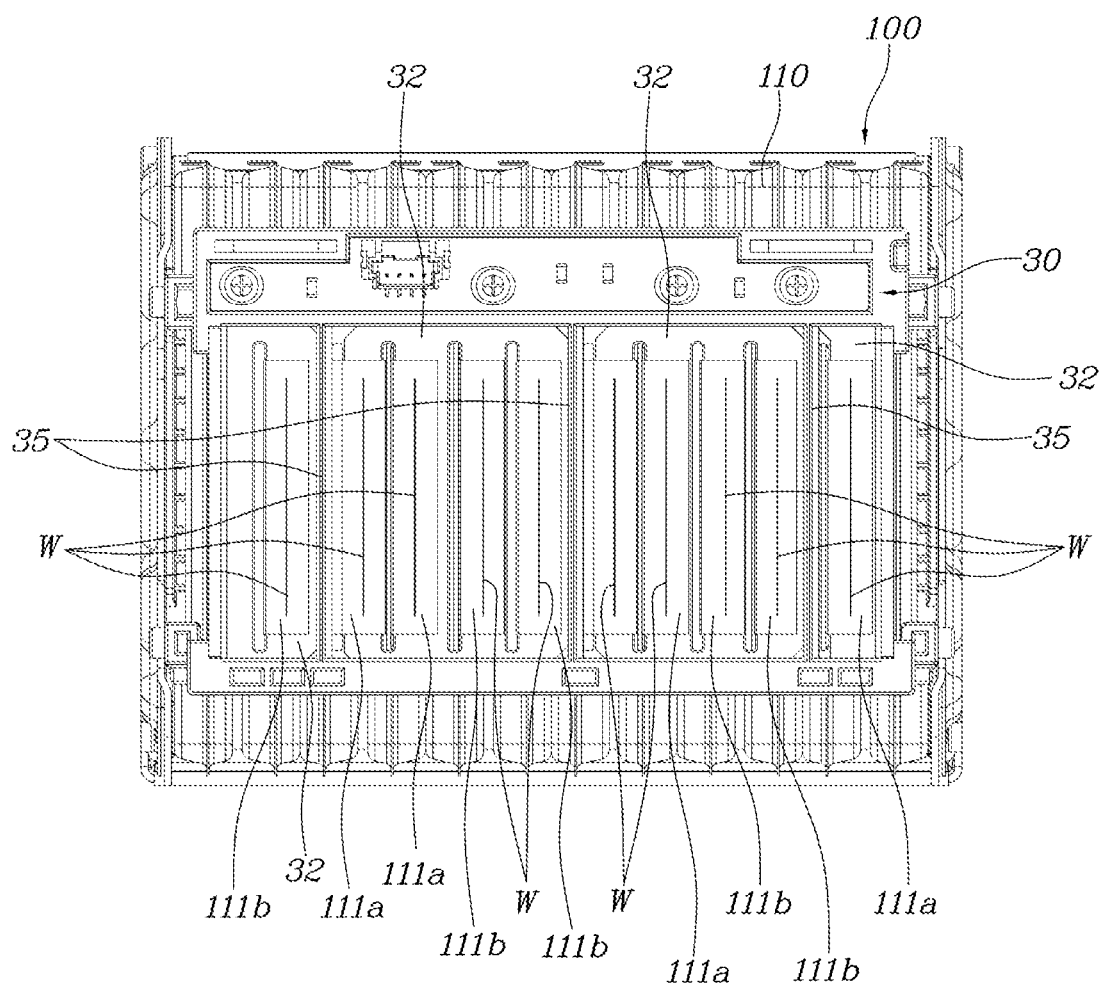
FIG. 11 is a plan view illustrating a joined state of a busbar of the busbar assembly illustrated in FIG. 10 and battery cell electrodes in a laminated structure.
Figure 12:
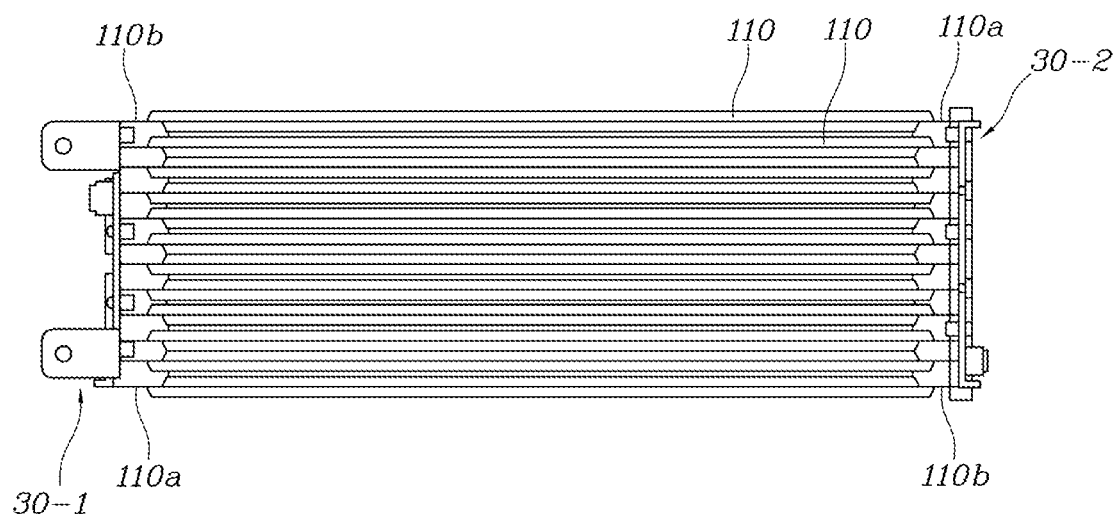
FIG. 12 is a plan view of a joined state of the busbar assembly illustrated in FIG. 10 and a laminated structure when viewed in a third direction.

FIG. 10 is an enlarged plan view of a busbar assembly applied to a battery module according to one form of the present disclosure, FIG. 11 is a plan view illustrating a joined state of a busbar of the busbar assembly illustrated in FIG. 10 and battery cell electrodes in a laminated structure, when viewed in the second direction, and FIG. 12 is a plan view of a joined state of the busbar assembly illustrated in FIG. 10 and a laminated structure, when viewed in the third direction.

As illustrated in FIG. 10, the busbar assembly 30 may include a frame 31 formed of an insulation material such as plastic, and busbars 32 attached to the frame 31 and having slits 33 into which the electrodes 111a, 111b of the battery cells 110 can be inserted. An interval between the slits 33 may be an interval corresponding to an interval between the electrodes 111a, 111b of the battery cells 110 located in the laminated structure 100. The frame 31 may include partitions 35 formed in areas between the busbars, which should be electrically insulated from one another.

The busbar assembly 30 may include a circuit board 34 for monitoring voltages of the battery cells 110 belonging to the battery module. Here, the circuit board 34 may include a board, such as a PCB, on which a circuit pattern is printed, and electric devices mounted on the board as necessary.

As illustrated in FIGS. 11 and 12, if the electrodes 111a, 111b of the battery cells 110 are inserted into the slits 33 formed on the busbars 32 of the busbar assembly 30, all the electrodes 111a, 111b of the battery cells 110 may be bent at once to come in contact with the busbars 32, and then the busbars 32 and the electrodes 111a, 111b of the battery cells 110 may be joined to one another through one welding process.

Figure 13:
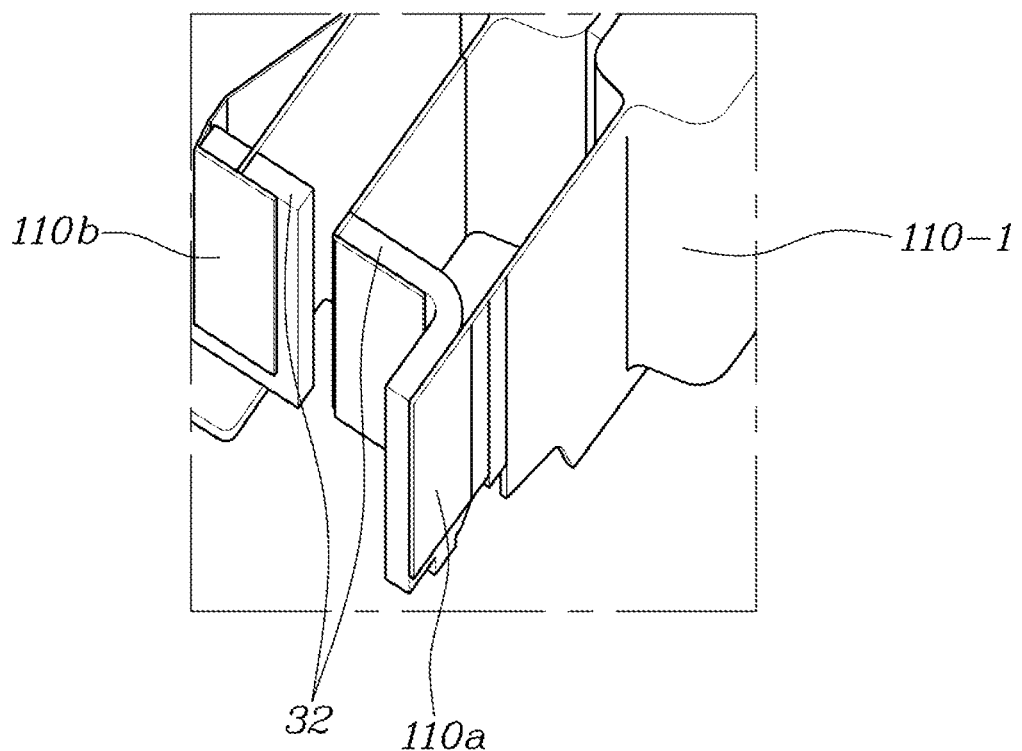
FIG. 13 is a perspective view illustrating a structure in which an electrode of an outermost battery cell of a laminated structure is joined to the busbar assembly illustrated in FIG. 10.

FIG. 13 is a perspective view illustrating a structure in which an electrode of an outermost battery cell of a laminated structure is joined to the busbar assembly illustrated in FIG. 10.

As illustrated in FIG. 13, the electrode of a battery cell 110-1 disposed at the outermost side of the laminated structure may not be inserted into the slit 33 formed on the busbar 32, but may be welded and joined to a side end portion of the busbar 32 having a structure, bent in parallel to the second direction, without separate bending.

In FIG. 11, the reference numeral "W" denotes an area onto which welding energy for welding is irradiated. Further, in FIG. 12, the reference numeral "30-1" indicates a busbar assembly installed on one surface in the second direction, and the reference numeral "30-2" indicates a busbar assembly installed on the other surface in the second direction. For convenience in explanation, the busbar assembly corresponding to the reference numeral "30-1" is referred to as a front busbar assembly, and the busbar assembly corresponding to the reference numeral "30-2" is referred to as a rear busbar assembly.

In case of the battery module in the related art, an electrode of a unit battery cell is bent in advance, primary welding is performed, a plurality of unit battery cells are re-laminated, and then secondary welding is re-performed, thereby implementing an electrical connection of the battery cell laminated structure. Such a battery module in the related art may have disadvantages in that a large number of bending and welding processes is performed, and a step height occurs on a welding target during the secondary welding since it is difficult to provide uniformity.

However, according to one form of the present disclosure, it is possible to form an electrical connection between all the battery cells in the battery module through one bending process and one welding process by applying the busbar assembly 30, thereby simplifying the processes and improving the manufacturing quality.

Figure 14:
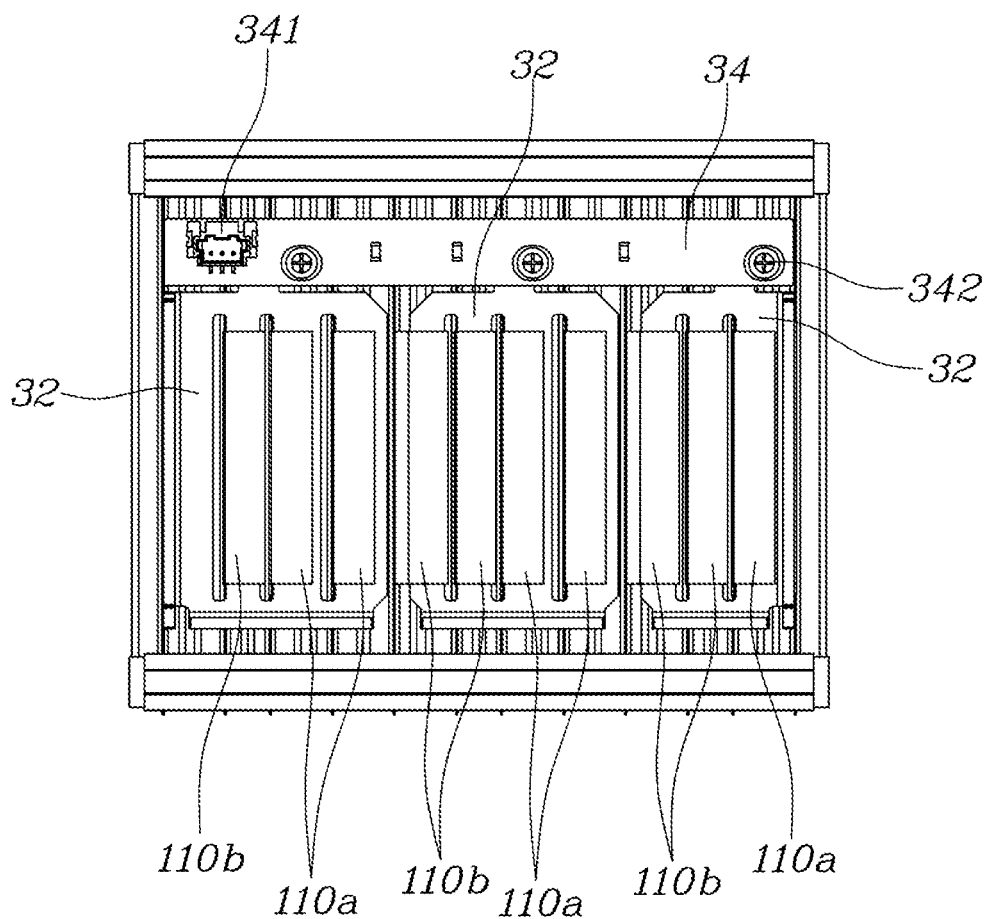
FIG. 14 is a plan view illustrating a connection state of a busbar in a front busbar assembly illustrated in FIG. 12 and a circuit board.
Figure 15:
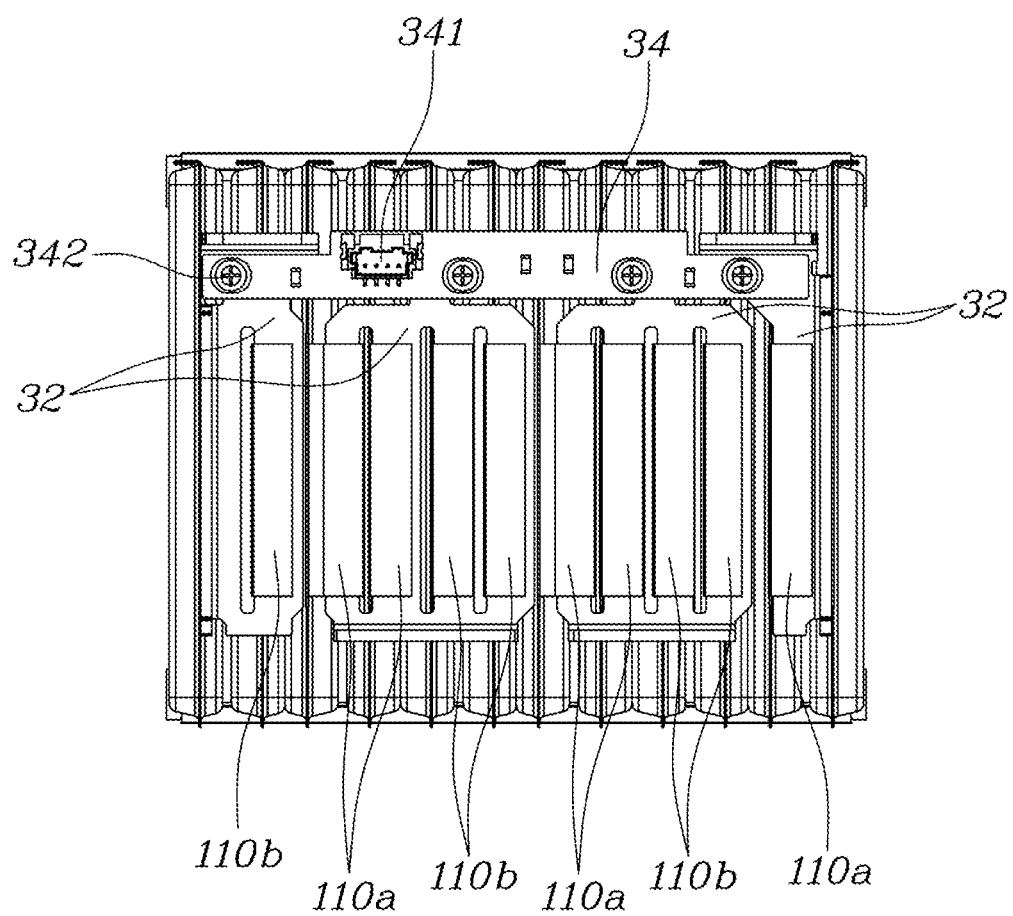
FIG. 15 is a plan view illustrating a connection state of a busbar in a rear busbar assembly illustrated in FIG. 12 and a circuit board.

FIG. 14 is a plan view illustrating a connection state of a busbar in a front busbar assembly illustrated in FIG. 12 and a circuit board, and FIG. 15 is a plan view illustrating a connection state of a busbar in a rear busbar assembly illustrated in FIG. 12 and a circuit board.

As illustrated in FIGS. 14 and 15, the busbars 32 in each busbar assembly may be electrically connected to the circuit board 34. More specifically, the respective busbars electrically insulated from one another may be connected to conductive patterns, which are in a mutually insulated state, and are formed on the circuit board 34, through screws 342, and the respective conductive patterns in the circuit board 34 may be electrically connected to pins of a connector 341, respectively.

In case that a plurality of battery modules are disposed in a battery pack, electrical connections may be formed on the connector 341 provided in the front and rear busbar assemblies 30-1, 30-2 of each battery module, and voltages of the battery cells in the battery module can be detected and monitored. The voltage of the battery cell may be managed through a cell management unit (CMU) installed in the battery pack.

Figure 16:
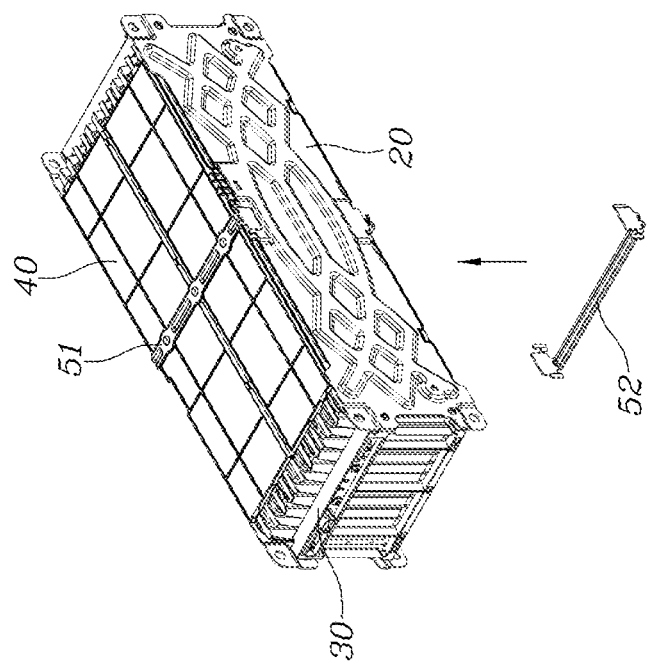
FIG. 16 is a perspective view illustrating a location relationship among a cover, a first clamp and a second clamp, and a laminated structure of a battery module according to one form of the present disclosure.
Figure 16:
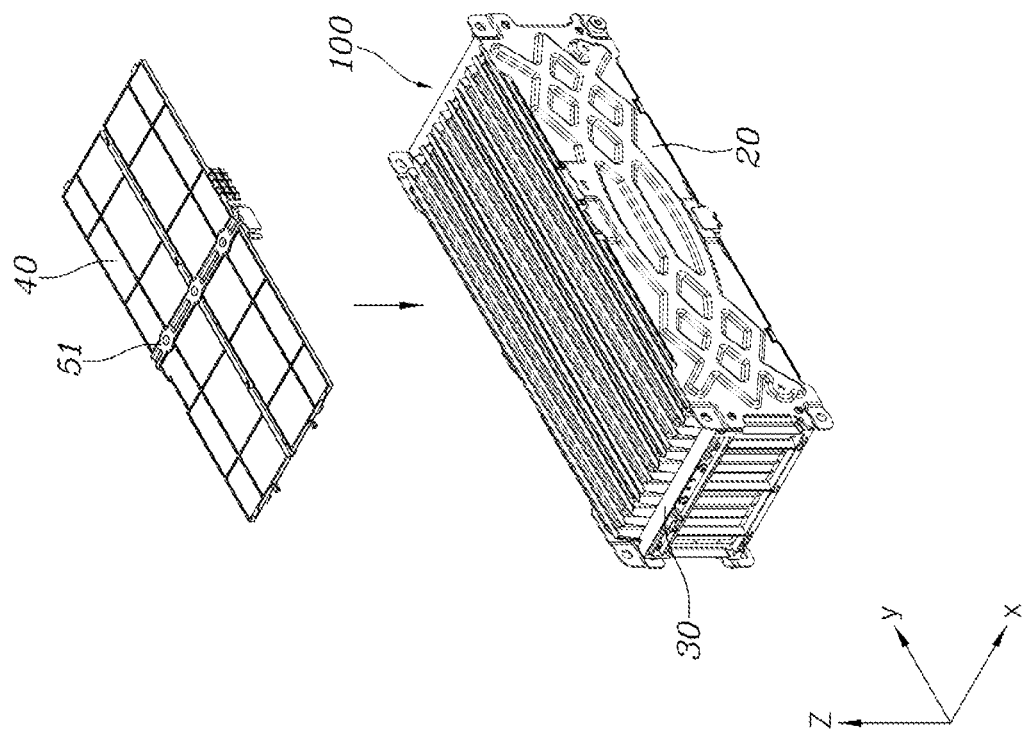

FIG. 16 is a perspective view illustrating a location relationship among a cover, a first clamp and a second clamp, and a laminated structure of a battery module according to one form of the present disclosure.

As illustrated in FIG. 16, the first cover 40 may be disposed at one end of the laminated structure 100 in the third direction of the battery cell laminated structure 100.

Further, the first clamp 51 having a bar structure and extending along the first direction outside the first cover 40 may be disposed across the laminated structure 100, and both ends of the first clamp 51 may be joined to the pair of end plates 20, respectively.

Further, in the vicinity of the other surface facing one surface of the laminated structure 100 on which the first cover 40 is disposed, the second clamp 52 having a bar structure and extending along the first direction may be disposed across the laminated structure 100, and both ends of the second clamp 52 may be joined to the pair of end plates 20, respectively.

The first clamp 51 may be fixed to the first cover 40 through heat fusion, and since the both ends of the first clamp 51 are joined to the two end plates 20, respectively, the first clamp 51 may constantly maintain the distance between the two end plates 20 even during the swelling of the battery cell 110. Further, the second clamp 52 may be disposed to be spaced apart from and adjacent to the exposed surface (lower surface in the drawing) of the laminated structure 100, and in the same manner as the first clamp 51, the second clamp 52 may constantly maintain the distance between the two end plates 20 even during the swelling of the battery cell.

Figure 17:
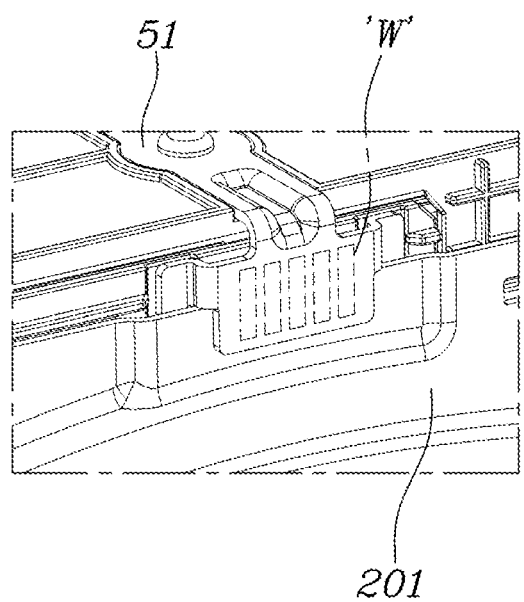
FIG. 17 is a view illustrating one end portion of the first clamp illustrated in FIG. 12.

FIG. 17 is a view illustrating one end portion of the first clamp illustrated in FIG. 12.

As illustrated in FIG. 17, the end portion of the first clamp 51 may have a hook-like structure bent in the direction of the end plate 20, and the bent end portion may face the outer surface of the end plate 20. The bent end portion may be fixed to the end plate 20 by being welded to the outer surface that is adjacent to one side of the end plate 20 ("W": welding area). The joining structure illustrated in FIG. 11 may be applied even to the second clamp 52 in the same manner.

As described above, the first clamp 51 is joined to each side (upper side in the drawing) of the two end plates, and the second clamp 52 is joined to each long side (lower side in the drawing) of the two end plates 20 to which the first clamp 51 is joined, so that the interval between the two end plates is constantly maintained in the center portion in the second direction of the end plates, and thus stiffness by the end plates can act on the internal battery cells.

Figure 18:
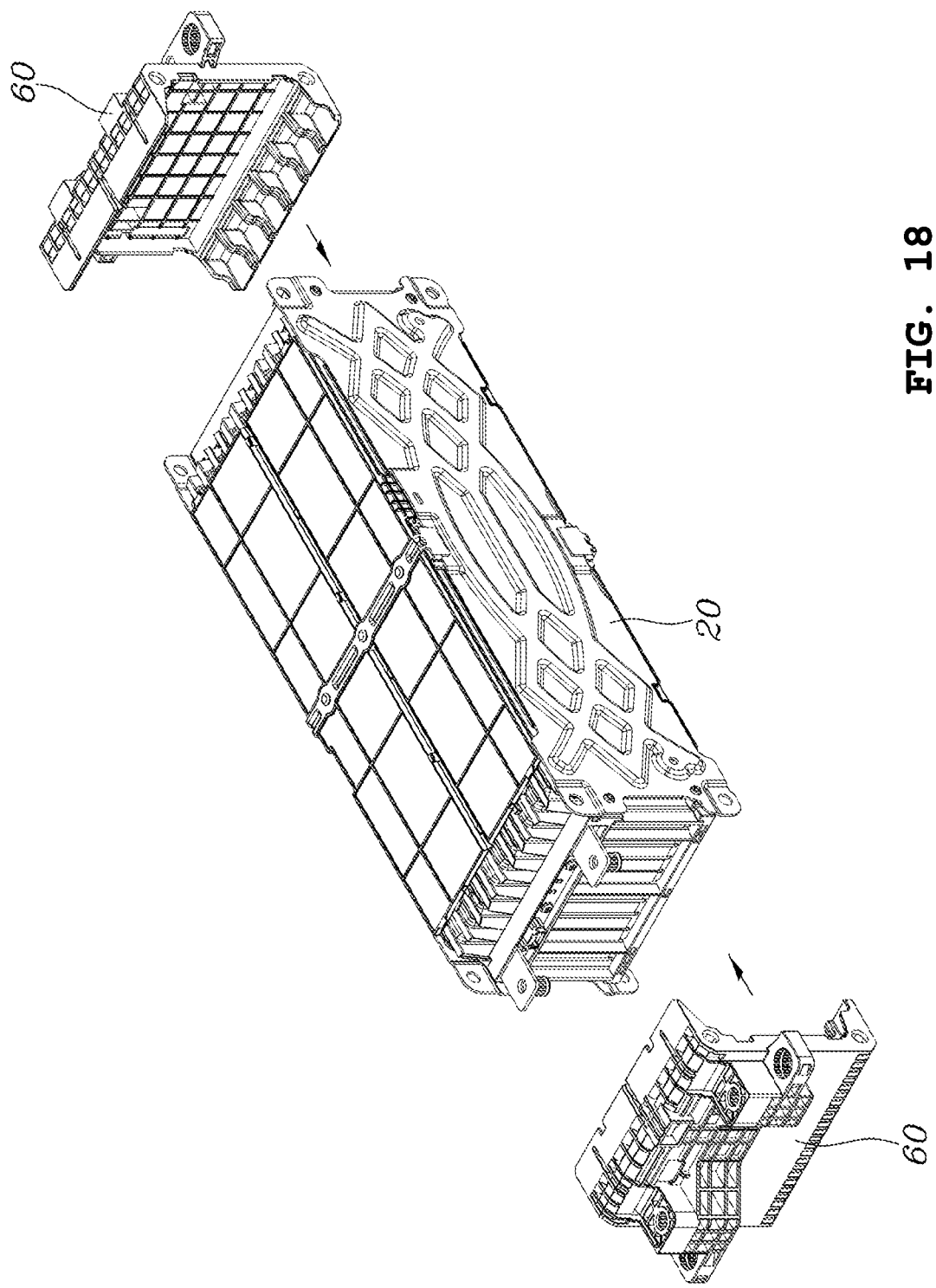
FIG. 18 is a perspective view illustrating a location relationship among a second cover, a third cover, and a laminated structure of a battery module according to one form of the present disclosure.

FIG. 18 is a perspective view illustrating a location relationship among a second cover, a third cover, and a laminated structure of a battery module according to one form of the present disclosure.

As illustrated in FIG. 18, the second cover 60 and the third cover 60 may be disposed at both ends of the laminated structure 100, respectively, in the second direction that is vertical to the lamination direction of the battery cell laminated structure 100, that is, in the direction in which the electrodes 111a, 111b of the battery cells 110 are connected to one another. Here, the second cover 60 and the third cover 60 have substantially the same construction and are installed in symmetrical locations of the battery module 10, and thus are denoted by the same reference numeral.

By installing the second cover 60 and the third cover 60, the busbar assemblies 30 are covered to finally complete the battery module 10. The second cover 60 and the third cover 60 may include through-holes for exposing elements that should be exposed to an outside of the battery module (e.g., a part of the busbar to be exposed for external electrical connection, connector for providing information on cell voltage detection, and the like) among the elements provided in the busbar assemblies 30.

Figure 19:
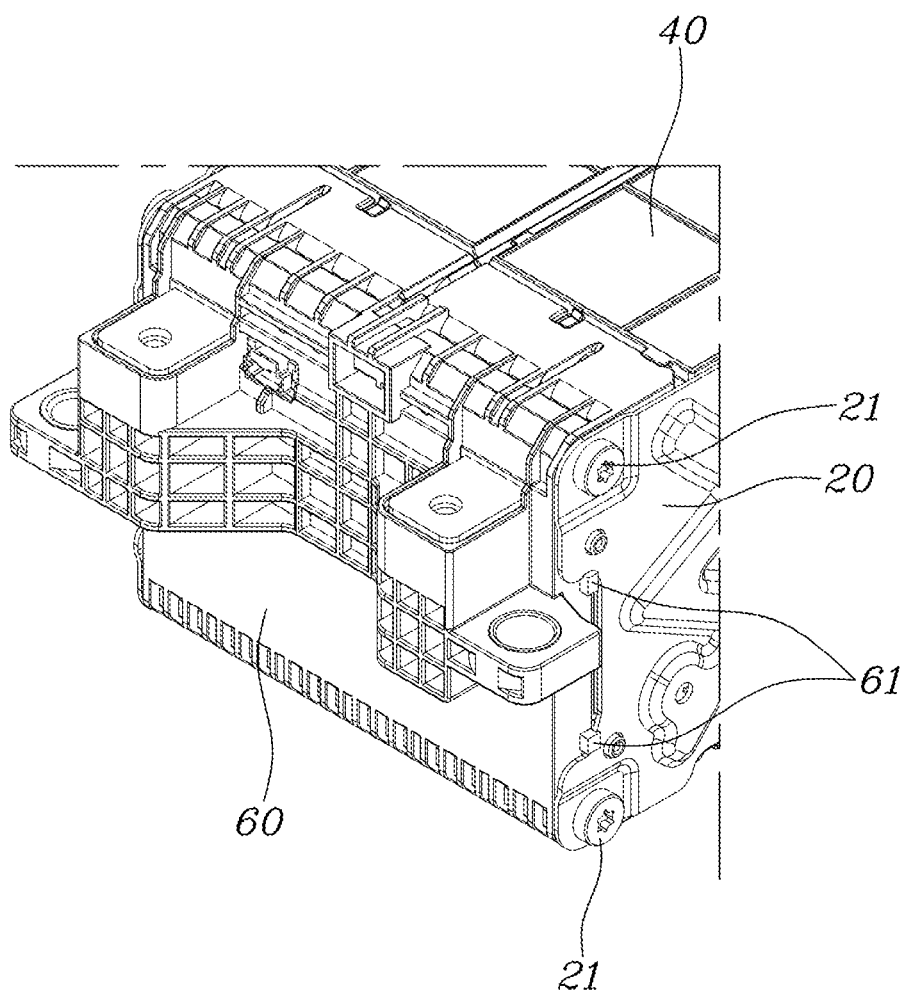
FIG. 19 is a view illustrating in detail an assembled structure of a second cover and a third cover in a battery module according to one form of the present disclosure.

FIG. 19 is a view illustrating in detail an assembled structure of a second cover and a third cover in a battery module according to one form of the present disclosure.

As illustrated in FIG. 19, side portions of the second cover 60 and the third cover 60 may come in contact with the end plate 20. The side portions of the end plate 20, the second cover 60, and the third cover 60 may be joined to one another through bolts 21. Although not illustrated, the two end plates 20 may be joined to the cover 60 in a manner that the bolts 21 are joined to both ends of one long nut disposed inside the cover 60.

In addition, on the side portions of the second cover 60 and the third cover 60, a catching projection 61 projecting in the first direction may be formed, and an edge of the end plate 20 may get caught by the catching projection 61 to form mutual assembly regulations.

Figure 20:
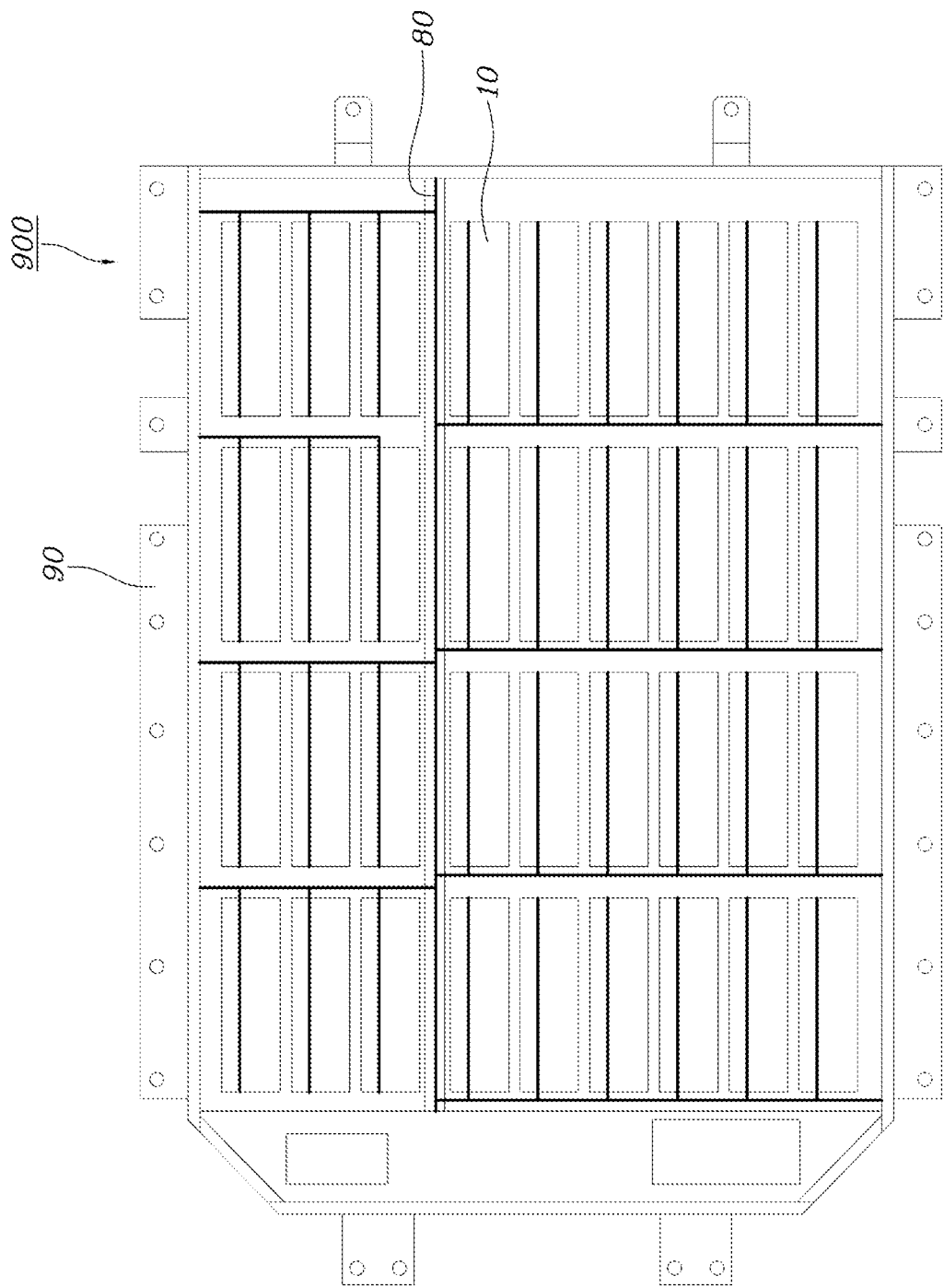
FIG. 20 is a plan view illustrating a battery pack in which battery modules are disposed according to one form of the present disclosure.
Figure 21:
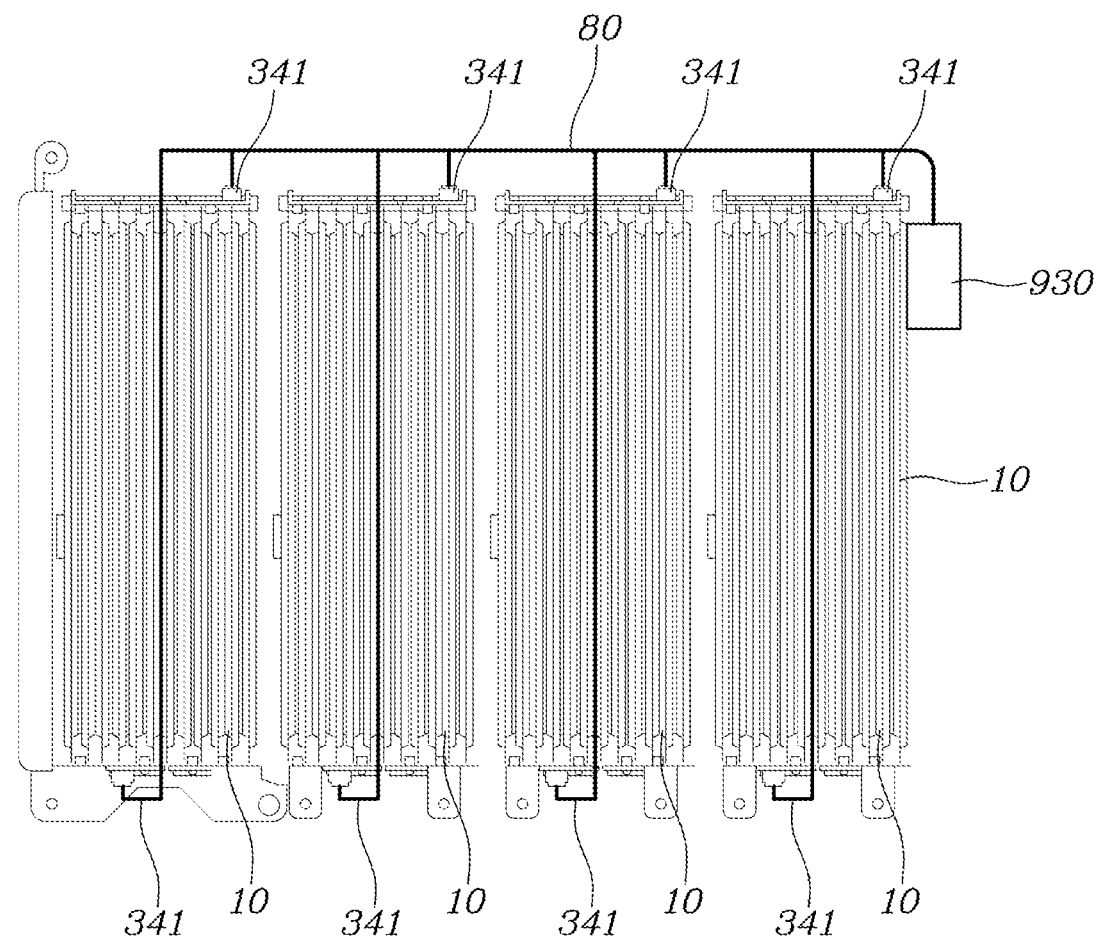
FIG. 21 is a plan view illustrating in more detail one portion of the battery pack illustrated in FIG. 20.

FIG. 20 is a plan view illustrating a battery pack in which battery modules are disposed according to one form of the present disclosure, and FIG. 21 is a plan view illustrating in more detail one portion of the battery pack illustrated in FIG. 20.

As illustrated in FIGS. 20 and 21, the battery module 10 according to one form of the present disclosure may be seated on a lower case 910 of a battery pack 900 with a predetermined array pattern. On the busbar assembly of each battery module 10 according to one form of the present disclosure, the connector 341 that can be used to detect the battery voltage is provided. Thus, by forming an electric wiring 80 connected to the connector 341 after disposing the battery module in the lower case 910 of the battery pack 900 in a desired array form, it becomes possible to detect and monitor the battery cell voltage in the battery module 10.

In particular, as illustrated in FIG. 21, the connectors 341 of the predetermined number of battery modules 10 among the plurality of battery modules 10 may be connected to one cell management module 930, and the one cell management module 930 may perform voltage detection and monitoring with respect to the plurality of battery modules 10 to which the electric wiring is connected.

A plurality of cell management units may be installed in the battery pack 900, and may transmit, to an upper level controller using the electric wiring 80, information on the results of battery cell voltage detection with respect to the plurality of battery modules 10 connected to the cell management units.

As described above, according to the battery module and the battery pack including the same according to various forms of the present disclosure, since the clamps are welded to both the end plates in the center portions of the battery module in the direction in which the battery cells are laminated, and the end plates are bolt-joined to the covers in the both end portions of the battery module, sufficient stiffness can be provided.

Further, according to the battery module and the battery pack including the same according to various forms of the present disclosure, since the busbar assemblies are adopted and the electrical connection between the electrodes of the plurality of laminated battery cells can be formed through one bending process and one welding process, the processes can be simplified, and the manufacturing quality can be improved through removal of the result deviation between the battery cells.

Further, according to the battery module and the battery pack including the same according to various forms of the present disclosure, since the battery cells forming the battery pack are produced in the form of a module, the standardized battery cells can be applied to the batter pack having various specifications even if the specification of the battery pack is changed in accordance with the vehicle type. Therefore, a separate design process for disposal of the battery cells in the battery pack can be omitted, and thus the development period and the development costs can be reduced.

Further, According to the battery module and the battery pack including the same according to various forms of the present disclosure, since the battery cells in the battery module can come in contact with the seating surface of the battery pack case through the gap filler without any other interference element, the heat generated from the battery cells can be discharged more effectively.

Although the specific forms of the present disclosure have been illustrated and described for illustrative purposes, those of ordinary skill in the art will appreciate that various modifications, additions and substitutions are possible, without departing from the scope and spirit of the present disclosure.

What is claimed is:

1. A battery module comprising:
   a plurality of battery cells mutually laminated in a first direction and forming a laminated structure;
   a pair of end plates, each end plate of the pair of end plates being in surface contact with a first end and a second end of the laminated structure, respectively, in the first direction; and
   a pair of busbar assemblies, each bus bar assembly of the pair of bus bar assemblies disposed at the first and the second ends of the laminated structure, respectively, in a second direction perpendicular to the first direction, and each bus bar assembly including:
      a busbar configured to mutually join electrodes of the plurality of battery cells located at the first and the second ends of the laminated structure in the second direction,
      a circuit board on which an electrical connection to the busbar is formed, and
      a connector installed on the circuit board and electrically connected to the busbar assembly through the circuit board,
      wherein one busbar assembly of the pair of busbar assemblies include mutually insulated busbars that are electrically connected to different pins of the connector in a mutually insulated state through a circuit pattern formed on the circuit board.

2. The battery module according to claim 1, wherein the busbar comprises a plurality of slits, and
   each electrode of the electrodes of the plurality of battery cells includes a bent portion penetrating a slit of the plurality of slits and joined to the busbar.

3. The battery module according to claim 2, wherein the busbar includes a first side end and a second side end that are bent, and
   a battery cell of the plurality of battery cells disposed at an outermost side in the laminated structure includes an electrode that is not bent and is joined to the first and second side ends of the busbar.

4. The battery module according to claim 1, wherein the busbar is screw-fastened to the circuit board.

5. The battery module according to claim 1, further comprising:
   a first cover configured to cover a first side of the laminated structure in a third direction perpendicular to the first direction and the second direction;
   a first clamp including a first end and a second end, each joined to the pair of end plates across an outer surface of the first cover; and
   a second clamp having a first end and a second end, each joined to the pair of end plates across a surface of the laminated structure facing a surface on which the first cover is disposed.

6. The battery module according to claim 5, further comprising a second cover and a third cover configured to cover the laminated structure in the second direction from outsides of the pair of busbar assemblies.

7. The battery module according to claim 5, wherein the first clamp is attached to the first cover, and
   the first and the second ends of the first clamp are bent and face the pair of end plates, and are joined to outer surfaces of the pair of end plates.

8. The battery module according to claim 5, wherein the first and the second ends of the second clamp are bent and face the pair of end plates, and are joined to the outer surfaces of the pair of end plates.

9. The battery module according to claim 1, wherein the laminated structure comprises a plurality of cell assemblies, each cell assembly of the plurality of cell assemblies including a pair of battery cells laminated with a surface pressure pad interposed therebetween, and
   the plurality of cell assemblies are laminated in the first direction.

10. The battery module according to claim 9, wherein the pair of battery cell disposed adjacently include electrodes having a same polarity.

11. The battery module according to claim 9, wherein the pair of battery cells disposed adjacently include electrodes having different polarities.

12. The battery module according to claim 9, wherein the plurality of cell assemblies are laminated with a hot-melt interposed therebetween.

13. A battery module comprising:
   a plurality of battery cells mutually laminated in a first direction and forming a laminated structure;
   a pair of end plates, each end plate of the pair of end plates being in surface contact with a first end and a second end of the laminated structure, respectively, in the first direction; and
   a pair of busbar assemblies, each bus bar assembly of the pair of bus bar assemblies disposed at the first and the second ends of the laminated structure, respectively, in a second direction perpendicular to the first direction, and each bus bar assembly including:

a busbar configured to mutually join electrodes of the plurality of battery cells located at the first and the second ends of the laminated structure in the second direction, a circuit board on which an electrical connection to the busbar is formed, and a connector installed on the circuit board and electrically connected to the busbar assembly through the circuit board, wherein each end plate of the pair of end plates comprises:

an inner plate formed of an insulation material and being in surface contact with the laminated structure; and an outer plate configured to cover the inner plate and having stiffness higher than that of the inner plate.

14. The battery module according to claim 13, wherein the outer plate is molded on an end portion adjacent to the first cover, is spaced apart by a predetermined distance from the laminated structure, and forms an insertion space configured to receive a temperature sensor therein.

* * * * *